United States Patent
Harmening

[11] 3,889,551
[45] June 17, 1975

[54] EQUIPOISE MECHANISM

[75] Inventor: Wayne Arthur Harmening, Cherry Hill, N.J.

[73] Assignee: RCA Corporation, New York, N.Y.

[22] Filed: Dec. 27, 1973

[21] Appl. No.: 428,796

[52] U.S. Cl. ............................... 74/469; 343/763
[51] Int. Cl. ............................................. G05g 1/00
[58] Field of Search ....... 74/470, 469; 343/763, 766

[56] References Cited
UNITED STATES PATENTS

| | | | |
|---|---|---|---|
| 2,587,376 | 2/1952 | Pelly et al. | 74/470 X |
| 3,049,016 | 8/1962 | Stuhler | 343/763 X |

OTHER PUBLICATIONS
Dodge Passenger Car Service Manual 1958 Dodge Div., Chrysler Corp., Detroit 31, Mich. section 8, p. 2–4. TL 215.D5 C51.

*Primary Examiner*—Samuel Scott
*Assistant Examiner*—F. D. Shoemaker
*Attorney, Agent, or Firm*—Edward J. Norton; William Squire

[57] ABSTRACT

A four bar linkage and a spring provide a linear torque on one bar of the linkage as a counterbalance for a non-linear torque developed on another bar by a rotating mass. The proportions of each bar are developed in accordance with a given set of initial conditions.

10 Claims, 6 Drawing Figures

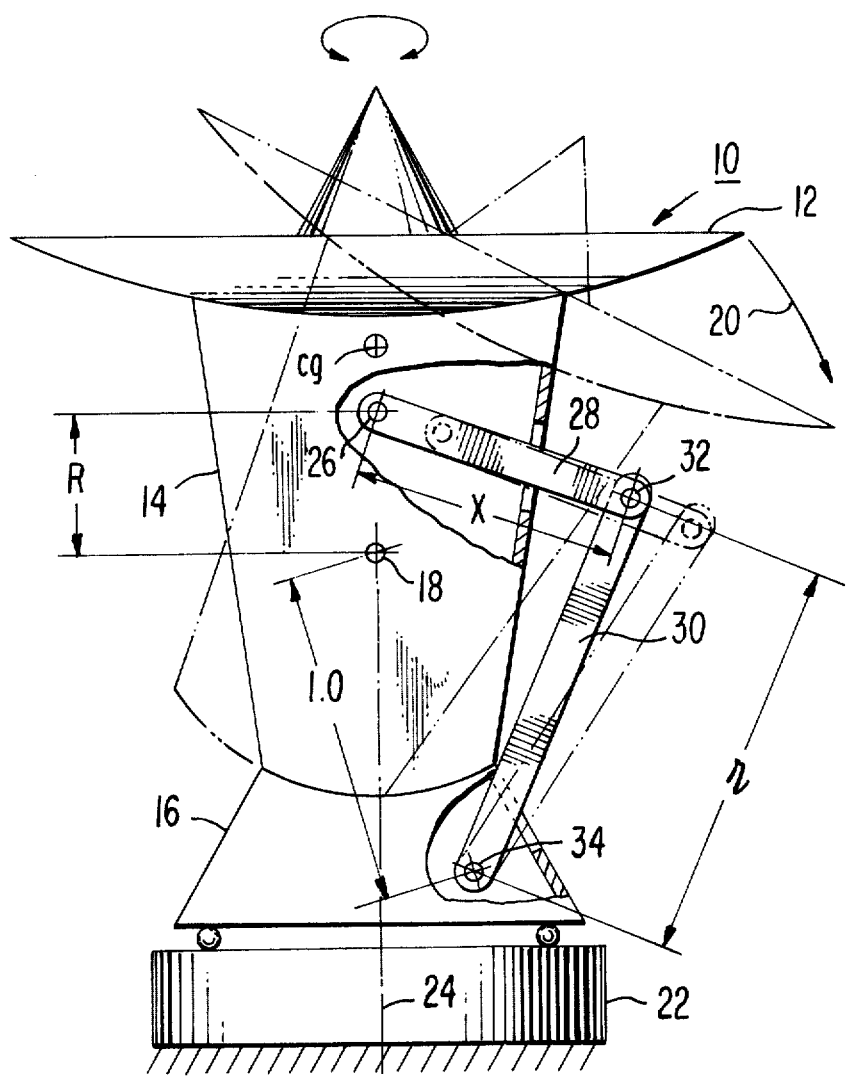
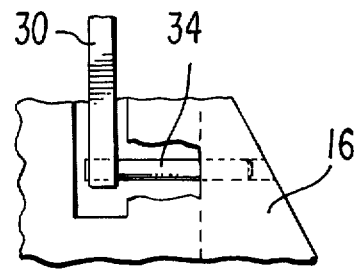
Fig. 1a.
Fig. 1b.

EQUIPOISE MECHANISM

BACKGROUND OF THE INVENTION

The present invention relates to an apparatus for balancing an unbalanced rotating mass. Rotating mass unbalances are present in a variety of devices and, in particular, in antennas as employed in radar systems or the like. These antennas usually have mass unbalance about the elevation axis. Frequently a counterbalancing mass is added, at the expense of increased weight and inertia which is an additional load for the driving motor.

Other ways utilized for overcoming the mass unbalance include methods utilizing cams, springs, sprockets, gearing and the like. However, these other methods require additional complex mechanisms and add greatly to the expense of the system.

The use of a spring force to overcome mass unbalance is an attractive method for avoiding weight and inertia penalties. However, the mass unbalance varies as a function of the sine of the elevation axis angle. This nonlinear relationship results in a mechanization that is generally complex and costly to achieve.

SUMMARY OF THE INVENTION

In accordance with the present invention an apparatus is provided for balancing a non-linear torque produced by an offset mass rotating with respect to a support. A four bar linkage is provided wherein each bar is pivotally connected to two other bars of the linkage to form a quadrangle. Means are provided for securing a first bar to the rotating mass. Means are provided for securing the support to a second bar. Resilient means are coupled to the second and third bars to produce a linear torque on the third bar as that bar rotates. The bars each have a predetermined length which length is a function of the angular displacement of the third bar with respect to the angular displacement of the rotating mass. The lengths of the bars are such that the linear torque at the third bar balances the non-linear torque.

IN THE DRAWINGS

FIGS. 1a and b illustrate an apparatus constructed in accordance with an embodiment of the present invention, FIG. 2 is a schematic illustration useful in explaining the principles of the present invention, and FIGS. 3, 4 and 5 are graphs of waveforms useful in explaining the principles of the present invention.

DETAILED DESCRIPTION

Figure 2:
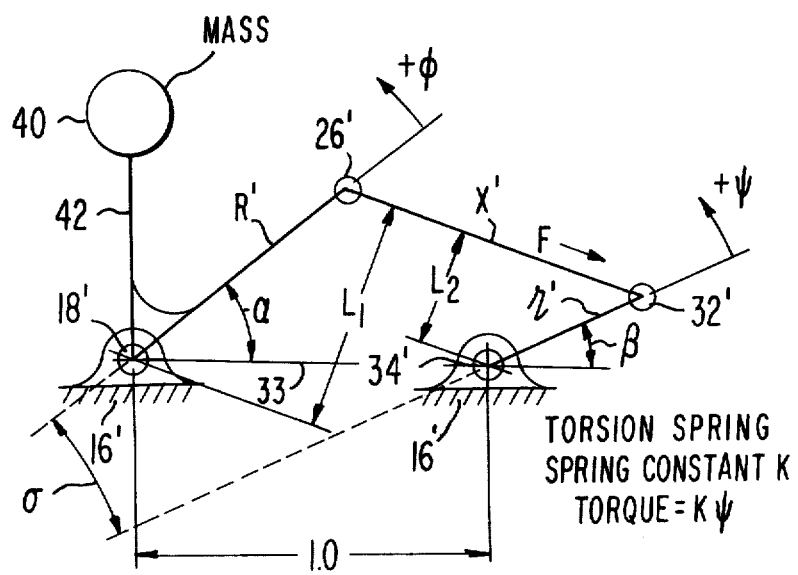

In FIG. 1a a radar antenna 10 is utilized to illustrate an embodiment of the present invention. Antenna 10 includes a radar dish 12 and a base 14. Base 14 has a center of gravity indicated at cg. This center of gravity is hereinafter referred to as cg.

Base 14 is pivotally mounted to support 16 by way of pivot pin 18. Base 14 rotates about pivot pin 18 in the elevation angle as indicated by arrow 20. Support 16 in turn is rotatably mounted to a second support 22 which is anchored to the ground. Support 16 rotates about support 22 in the azimuth direction via axis 24. Arm 28 is pivotally mounted at one end to base 14 at pivot pin 26. The other end of arm 28 is pivotally mounted to arm 30 by way of pivot pin 32. The other end of arm 30 is pivotally mounted to support 16 by way of torsion bar 34. Torsion bar 34, as seen in FIG. 1b, is a rod of suitable length of predetermined spring characteristics which is fastened at one end thereof to arm 30 and at the other end to base 16. As arm 30 rotates with respect to base 16, torsion bar 34 provides a linear spring load between arm 30 and base 16. The spring constant for torsion bar 34 is $k$.

In FIG. 1a if the distance between the center of pivot pin 18 and the center of torsion bar 34 is set as unity or 1.0, then the distances between the remaining pivot pins will be assigned values as follows. The distance between the center of pivot pin 26 and pivot pin 18 is given as R. The distance between pivot pin 26 and pivot pin 32 is given as X. The distance between pivot pin 32 and the center of torsion bar 34 is given as $r$. In each case, the center of the respective pivot pins and torsion bar 34, referred to above, is the axis of rotation. In the position shown in the cg of the antenna 10 including base 14 and dish 12, pivot pin 26 and pivot pin 18 are in alignment parallel to axis 24 with the cg positioned top dead center.

Figure 3:
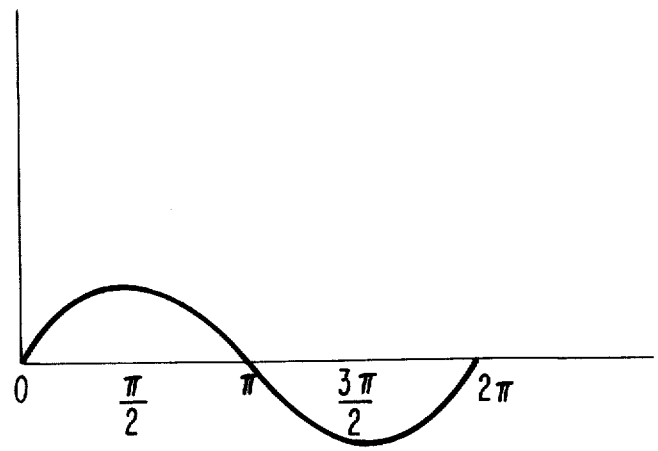

It can be shown that the torque produced by the rotating antenna varies as the sine of the angles that the cg makes with the center of rotation at pivot pin 18. This relationship is shown at FIG. 3.

As provided in accordance with the present invention, the distances R, X, $r$ are so related with respect to each other and unity (the distance between pivot pin 18 and torsion bar 34) such that the linear spring constant $k$ of torsion bar 34 will provide a torque that varies with the sine of the angular displacement of the cg of antenna 10 about pivot pin 18. The torque so developed thus will balance the unbalance torque produced by the antenna 10. While in FIG. 1a pivot pin 26 is shown in alignment with cg and pivot pin 18, it will be appreciated in the manner to be described with reference to FIG. 2, that pivot pin 26 need not be in alignment with the cg and pivot pin 18.

In FIG. 2 there is shown a schematic arrangement of the various linkage bars of the arrangement of FIG. 1a for purposes of explanation and discussion. The elements of FIG. 2 relate to corresponding elements in the structure of FIG. 1a as explained below. In FIG. 1a, the mass to be balanced, that is, the mass concentrated at the cg of antenna 10, is vertically centered above pivot pin 18 so that at that position there is no mass unbalance present in the antenna 10 structure including base 14 and dish 12. In FIG. 2, the mass of antenna 10 comprising dish 12 and base 14 concentrated at the cg is indicated by mass 40. A reference position is established with the mass directly above pivot pin 18' which corresponds to pivot pin 18 of FIG. 1a. In this position, mass 40 is balanced above pivot pin 18' so that there is no unbalance present.

Mass 40 is pivoted about pivot pin 18' by way of bar 42. Bar 42 is secured to bar R' and both of these bars pivot in unison about pivot pin 18'. The other end of bar R' is pivotally connected by way of pivot pin 26' which corresponds to pivot pin 26 of FIG. 1a. Bar X' is pivotally connected to pivot pin 26' at one end and pivot pin 32' at the other end which corresponds to pivot pin 32 in the structure of FIG. 1a. Bar $r'$ is connected at one end by way of pivot pin 32' and the other end to torsion bar 34'. Pivot pin 18' and torsion bar 34' are mounted on a suitable support 16' which corresponds to support 16 of FIG. 1a. The length of bar R' is given by the distance R, the length of bar X' by the distance X, the length of $r'$ by distance $r$, and the distance between pivot pin 18' and torsion bar 34' are assigned unity.

A reference position for the four bar linkage is defined as follows:

The reference angles that bars R' and r' make with a line 33 through pins 18' and 34' is given by the angles $\alpha$ and $\beta$, respectively, as shown in FIG. 2. The reference position of the mass 40 is vertically above pin 18'. The angle between lines 42 and 33 is arbitrary.

The perpendicular distance between bar X' and pins 18' and 34' are given by lengths $L_1$ and $L_2$, respectively. The angular displacements of bar R' and r' from the reference position are given by the angles $\phi$ and $\psi$, respectively.

As provided in accordance with the present invention, a four bar linkage is derived in a manner to be described with respect to FIG. 2. With this four bar linkage a torsion spring having a spring constant $k$ may be developed for balancing the mass unbalance produced by mass 40. At least two methods for synthesizing a linkage of the type described in FIG. 2 are known. The complex number method used below herein is shown in a magazine article in "Getriebetechnik," Vol. 5, by K. H. Sieker, pp. 55–60, published by VDI (Association of German Engineers). The computational steps shown below herein are in part not in accord with the above reference, having been greatly simplified. The synthesis technique for deriving the lengths of bars R' and X' and r' is such that an infinite number of different linkages can be derived to fulfill a single functional requirement. Once the particular goemetry is ascertained, this geometry can then be analyzed for accuracy as a function generator, see FIG. 4, and for accuracy in developing torque, see FIG. 5, in conjunction with a linear torsion bar spring. As is shown below, the angular relationship between bars R' and r' is given by the function $\psi = \lambda \sqrt{1 - \cos\phi}$ and the mechanical advantage between bars R' and r' is given by $$\left(\frac{\lambda^2}{2\psi}\right) \sin\phi.$$

The following is an explanation of the derivation of the functional requirements for a four bar linkage using a linear torsion bar spring as a counterbalance for a rotating mass unbalance. Let the mass unbalance be $T_u$, then the unbalanced torque is given by $T_u \sin\phi$ where $\phi = 0$ corresponds to the top dead center position of mass 40 as shown in FIG. 2. The load crank formed by bar R' has a radius R and initial angle $\alpha$. The driven crank bar r' has a radius r at initial angle $\beta$ and drives a torsion spring 34 with a spring rate $k$. There is a 0 spring torque when $\psi$ is zero. Torque and velocity relations may be written in terms of the effective moment arms.

Thus, $$\frac{T_u \sin\phi}{L_1} = \frac{k\psi}{L_2} \quad (1)$$

and $$\frac{d\phi}{dt} L_1 = \frac{d\psi}{dt} L_2 \quad (2)$$

The linkage mechanical advantage is then:

$$\frac{L_1}{L_2} = \frac{T_u \sin\phi}{k\psi} = \frac{d\psi}{d\phi} \quad (3)$$

or $$k\psi d\psi = T_u \sin\phi \, d\phi \quad (4)$$

This equation may be integrated $$\frac{k\psi^2}{2} = -T_u \cos\phi + C \quad (5)$$

at $\phi = 0$; $\Psi = 0$ therefore $C = T_u$ or $$\frac{k\psi^2}{2} = T_u (1 - \cos\phi) \quad (6)$$

at $\phi = 90°$; $\psi = \lambda$
therefore $$k = \frac{2 T_u}{(\lambda)^2} \quad (7)$$

and substituting equation 7 into equation 6, results in $$\left(\frac{\psi}{\lambda}\right)^2 = 1 - \cos\phi \quad (8)$$

Equation 8 defines a functional relationship between arms R' and r' required to balance a mass unbalance torque $T_u$ using a linear torsional spring rate $k$ as defined in equation 7.

For linkage synthesis the torsion spring angular rotation $\lambda$ to be used in conjunction with a load travel of 90° is selected with $\lambda = 90°$. In addition, four $\phi$ and $\psi$ angle coordinates are selected excluding the set $\phi = 0$ and $\psi = 0$. The linkage obtained will change as the particular four coordinate sets are changed, wherein all linkages will be functionally exact at the four coordinates selected as well as at the set $\phi = 0$ and $\psi = 0$. This method is therefore called a five point synthesis. In the following analysis the values for $\phi$ and $\psi$ are as shown in Table I. In Table I the values for $\phi$ are selected as 0°, 20°, 50°, 70° and 90° and the corresponding values for $\psi$ are determined by substituting the angular values in equation 8. Actual numerical values are given for purposes of explanation, it being understood that other values may be developed for a four bar linkage which is the function of $\Psi = \lambda \sqrt{1 - \cos\phi}$ (equation 8).

TABLE I

| | |
|---|---|
| $\phi = 0$ | $\psi = 0$ |
| $\phi_1 = 20$ | $\psi_1 = 22.10180473°$ |
| $\phi_2 = 50$ | $\psi_2 = 53.79052296°$ |
| $\phi_3 = 70$ | $\psi_3 = 73.0043618°$ |
| $\phi_4 = 90$ | $\psi_4 = 90°$ |

In the present embodiment, a practical environment of a radar antenna sets the value of $\phi$ at approximately 90° from a reference position where the mass is positioned with the center of gravity top dead center.

See Table II for a detailed synthesis computation. Table II is a procedural outline based on the Sieker article referred to above herein. The procedure is general for any four bar linkage. In Table II computational steps are shown by which a four bar linkage may be derived. Table II is self explanatory. The numbers in Table II refer to a particular four bar linkage.

$K_0 = J_1J_5+J_4J_8 = -1.15541 \times 10^{-9}$
$K_1 = [J_1(J_7+J_8)-J_4(J_5+J_8)-J_2J_8+J_3J_5]\div K_0 = .0916362$
$K_2 = [J_3(J_7+J_8)-J_2(J_5+J_8)-J_1J_8)-J_4J_7]\div K_0 = -.0321719$
$K_3 = [J_2J_7-J_3J_6]/K_0 = -6.6426 \times 10^{-3}$ $TAN^3\sigma + K_1 TAN^2\sigma + K_2 TAN\sigma + K_3 = 0$
ONE REAL AND TWO IMAGINARY ROOTS
$TAN\sigma_1 = .210694 \qquad \sigma_1 = 11.8978°$
$TAN\sigma_2 = -.151165+.0931471i \quad \sigma_2 = $IMAGINARY ROOTS
$TAN\sigma_3 = -.151165-.0931471i \quad \sigma_3 = $IMAGINARY ROOTS
COMPUTATION CHECK $\sigma = \alpha - \beta = 11.89785°$ FOR EACH REAL ROOT$\sigma$
$M_1 = J_2(1+\cos 2\sigma)+J_1(1-\cos 2\sigma)-(J_4-J_3)\sin 2\sigma = 5.31431\times 10^{-4}$
$M_2 = J_3(1+\cos 2\sigma)+J_4(1-\cos 2\sigma)-(J_2-J_1)\sin 2\sigma = 1.64179\times 10^{-3}$

TABLE II

FOUR BAR LINKAGE SYNTHESIS COMPUTATION FIVE POINT METHOD

$C = \lambda \sqrt{1-\cos\phi}$
$\lambda = 90°$

| $\delta$ – Deg. | | $1-\cos\delta$ | | $\sin\delta$ | | |
|---|---|---|---|---|---|---|
| $\phi_1 = 20$ | $A_1 = .060307$ | | $B_1 = .342020$ | | $D_1 = A_1B_2 - A_2B_1 = -.759757$ |
| $\phi_2 = 50$ | $A_2 = .357212$ | | $B_2 = .7660444$ | | $D_2 = A_1B_3 - A_3B_1 = -.168372$ |
| $\phi_3 = 70$ | $A_3 = .657979$ | | $B_3 = .939693$ | | $D_3 = A_1B_4 - A_4B_1 = -.281713$ |
| $\phi_4 = 90$ | $A_4 = 1$ | | $B_4 = 1$ | | $D_4 = A_2B_3 - A_3B_2 = -.168372$ |
| $\psi_1 = 22.10180$ | $A_5 = .073483$ | | $B_5 = .376253$ | | $D_5 = A_2B_4 - A_4B_2 = -.408832$ |
| $\psi_2 = 53.79052$ | $A_6 = .409261$ | | $B_6 = .806863$ | | $D_6 = A_3B_4 - A_4B_3 = -.281713$ |
| $\psi_3 = 73.00436$ | $A_7 = .707701$ | | $B_7 = .956327$ | | $D_7 = A_7B_8 - A_8B_7 = -.248626$ |
| $\psi_4 = 90$ | $A_8 = 1$ | | $B_8 = 1$ | | $D_8 = A_6B_8 - A_8B_6 = -.397602$ |
| $\phi_1 - \psi_1 = -2.10180$ | $A_9 = 6.72761 \times 10^{-4}$ | | $B_9 = -.036675$ | | $D_9 = A_6B_7 - A_7B_6 = -.179630$ |
| $\phi_2 - \psi_2 = -3.79052$ | $A_{10} = 2.18758 \times 10^{-3}$ | | $B_{10} = -.066109$ | | $D_{10} = A_5B_8 - A_8B_5 = -.302770$ |
| $\phi_3 - \psi_3 = -3.00436$ | $A_{11} = 1.37445 \times 10^{-3}$ | | $B_{11} = -.524120$ | | $D_{11} = A_5B_6 - A_6B_5 = -.094695$ |
| $\phi_4 - \psi_4 = 0$ | $A_{12} = 0$ | | $B_{12} = 0$ | | $D_{12} = A_5B_7 - A_7B_5 = -.196001$ |

$F_1 = -B_6 D_6 + B_7 D_5 - B_8 D_4 = +4.69834 \times 10^{-3} \quad G_1 = A_6 D_6 - A_7 D_5 + A_8 D_4 = +5.66492 \times 10^{-3}$
$F_2 = -B_5 D_6 + B_7 D_3 - B_8 D_2 = +4.95784 \times 10^{-3} \quad G_2 = A_5 D_6 - A_7 D_3 + A_8 D_2 = +1.02953 \times 10^{-2}$
$F_3 = -B_5 D_5 + B_6 D_3 - B_8 D_1 = +2.49667 \times 10^{-3} \quad G_3 = A_5 D_5 - A_6 D_3 + A_8 D_1 = +9.27601 \times 10^{-3}$
$F_4 = -B_5 D_4 + B_6 D_2 - B_7 D_1 = +1.55103 \times 10^{-4} \quad G_4 = A_5 D_4 - A_6 D_2 + A_7 D_1 = +2.76746 \times 10^{-3}$
$F_5 = B_{10} D_6 - B_{11} D_5 + B_{12} D_4 = -2.80399 \times 10^{-3} \quad G_5 = A_{10} D_6 - A_{11} D_5 + A_{12} D_4 = -5.43499 \times 10^{-5}$
$F_6 = B_9 D_6 - B_{11} D_3 + B_{12} D_2 = -4.43326 \times 10^{-3} \quad G_6 = A_9 D_6 - A_{11} D_3 + A_{12} D_2 = +1.97675 \times 10^{-4}$
$F_7 = B_9 D_5 - B_{10} D_3 + B_{12} D_1 = -3.62972 \times 10^{-3} \quad G_7 = A_9 D_5 - A_{10} D_3 + A_{12} D_1 = +3.41224 \times 10^{-4}$
$F_8 = B_9 D_4 - B_{10} D_2 + B_{11} D_1 = -9.73768 \times 10^{-4} \quad G_8 = A_9 D_4 - A_{10} D_2 + A_{11} D_1 = +1.50629 \times 10^{-4}$
$F_9 = B_{10} D_7 - B_{11} D_8 + B_{12} D_9 = -4.40272 \times 10^{-3} \quad G_9 = A_{10} D_7 - A_{11} D_8 + A_{12} D_9 = +2.59479 \times 10^{-6}$
$F_{10} = B_9 D_7 - B_{11} D_{10} + B_{12} D_{12} = -6.75039 \times 10^{-3} \quad G_{10} = A_9 D_7 - A_{11} D_{10} + A_{12} D_{12} = +2.48877 \times 10^{-4}$
$F_{11} = B_9 D_8 - B_{10} D_{10} + B_{12} D_{11} = -5.43368 \times 10^{-3} \quad G_{11} = A_9 D_8 - A_{10} D_{10} + A_{12} D_{11} = +3.94844 \times 10^{-4}$
$F_{12} = B_9 D_9 - B_{10} D_{12} + B_{11} D_{11} = -1.40628 \times 10^{-3} \quad G_{12} = A_9 D_9 - A_{10} D_{12} + A_{11} D_{11} = +1.77766 \times 10^{-4}$ $H_1 = A_5F_1 + B_5G_1 - B_6G_2 + A_7F_3 + B_7G_3 - A_8F_4 - B_8G_4 = -1.44012 \times 10^{-4}$
$H_2 = A_5G_1 - B_5F_1 - A_6G_2 + B_6F_2 + A_7G_3 - B_7F_3 - A_8G_4 + B_8F_4 = -6 \times 10^{-12}$ $M_3 = J_6(1+\cos 2\sigma) - J_5(1-\cos 2\sigma) - (J_7+J_8)\sin 2\sigma = -2.50877 \times 10^{-6}$
$M_4 = J_7(1+\cos 2\sigma) - J_8(1-\cos 2\sigma) + (J_5+J_6)\sin 2\sigma = -2.37168 \times 10^{-5}$ $J_1 = A_5F_5 - A_6F_6 + A_7F_7 - A_8F_8 = 1.33252 \times 10^{-5}$
$J_2 = B_5G_5 - B_6G_6 + B_7G_7 - B_8G_8 = -4.25328 \times 10^{-6}$
$J_3 = A_5G_5 - A_6G_6 + A_7G_7 - A_8G_8 = 5.96126 \times 10^{-6}$
$J_4 = B_5F_5 + B_6F_6 - B_7F_7 + B_8F_8 = -2.45895 \times 10^{-5}$
$J_5 = A_1F_9 - A_2F_{10} + A_3F_{11} - A_4F_{12} = -2.31686 \times 10^{-5}$
$J_6 = B_1G_9 - B_2G_{10} + B_3G_{11} - B_4G_{12} = 3.50190 \times 10^{-6}$
$J_7 = A_1G_9 - A_2G_{10} + A_3G_{11} - A_4G_{12} = -6.71264 \times 10^{-6}$
$J_8 = B_1F_9 + B_2F_{10} - B_3F_{11} + B_4F_{12} = 3.44328 \times 10^{-5}$ CARTESIAN DEFINITION OF LINKAGE AT $\phi_0 = 0; \psi_0 = 0$ $R_x = \dfrac{H_1M_1+H_2M_2}{M_1{}^2+M_2{}^2} = -2.57000 \qquad R_y = \dfrac{H_2M_1-H_1M_2}{M_1{}^2+M_2{}^2} = -7.93973$ $r_x = \dfrac{-H_1M_3-H_2M_4}{M_3{}^2+M_4{}^2} = -.63521 \qquad r_y = \dfrac{H_1M_4-H_2M_3}{M_3{}^2+M_4{}^2} = -6.00494$ $X = \sqrt{(1-R_x+r_x)^2+(R_y-r_y)^2} = 3.51517$ POLAR DEFINITION OF LINKAGE AT $\phi_0 = 0; \psi_0 = 0$ $R = \sqrt{R_x{}^2+R_y{}^2} = 8.34531 \qquad \alpha = \tan^{-1}\dfrac{R_y}{R_x} = -72.0638°$ $r = \sqrt{r_x{}^2+r_y{}^2} = 6.03844 \qquad \beta = \tan^{-1}\dfrac{r_y}{r_x} = -83.96166°$ The linkage is now completely defined in its initial position, i.e., $\phi = \psi = 0$. The crank and connecting link lengths are based on a unit distance between crank pivots. These lengths may be scaled up or down as necessary without affecting the function relationship of the linkage.

LINKAGE ANALYSIS

Having derived a particular linkage from the five point synthesis, it is desirable to analyze the actual balancing characteristics of the resultant derived four bar linkage and linear torsion spring.

In FIG. 2, the displacements $\phi$ and $\psi$ and the ratio $L1/L2$ may be defined as a function of $\alpha$, $\beta$, $R$, $r$ and $X$.

$\alpha = (180 - 72.0638) = 107.936$
$\beta = (180 - 83.9617) = 96.0383$
$R = 8.34531$
$r = 6.03844$
$X = 3.51517$ From FIG. 2, it can be shown that:

$$[R \sin(\alpha + \phi) - r \sin(\alpha + \psi)]^2 + [1 - R \cos(\alpha + \phi) + r \cos(\beta + \psi)]^2 = X^2 \quad (9)$$

Then $\cos(\beta+\psi) = \dfrac{1}{N^2+1} [\sqrt{N^2 - M^2 + 1} - NM]$   (10), where $$M = \dfrac{\dfrac{R^2 + r^2 + 1 - X^2}{2Rr} - \dfrac{1}{r} \cos(\alpha+\phi)}{\sin(\alpha+\phi)}$$

$$= \dfrac{.940122 - .165606 \cos(\alpha+\phi)}{\sin(\alpha+\phi)} \quad (11)$$

$$N = \dfrac{\dfrac{1}{R} - \cos(\alpha+\phi)}{\sin(\alpha+\phi)} = \dfrac{.119827 - \cos(\alpha+\phi)}{\sin(\alpha+\phi)} \quad (12)$$

Columns 1 and 2 of Table III list $\phi$ and the corresponding value of $\psi$ calculated using equation (10) above. Equation (10) defines how the output angle $\psi$ actually varies as a function of input angle $\phi$ using linkages having the geometry developed in accordance with equations (1) to (8) and Tables I and II.

The error E in action between the actual displacement crank angle $\psi$ and the desired theoretical angle as defined by equation (8) is $$E = \psi - 90 \sqrt{1 - \cos\phi} \quad (13)$$

The position error is listed in column 3 of Table III.

$$\dfrac{L_1}{L_2} = \dfrac{\dfrac{1}{r} \sin(\alpha+\phi) + \sin(\alpha+\phi - (\beta+\psi))}{\dfrac{1}{R} \sin(\beta+\psi) + \sin(\alpha+\phi - (\beta+\psi))}$$

$$= \dfrac{.165606 \sin(\alpha+\phi) + \sin(\alpha+\phi - (\beta+\psi))}{.119828 \sin(\beta+\psi) + \sin(\alpha+\phi - (\beta+\psi))} \quad (14)$$

The mechanical advantage calculated per equation 14 is listed in column 4 of Table III.

Assuming a mass unbalance of $T_u = 100$ ft. lb., the torsional spring constant is defined by $k$ using equation 7 and the value $\lambda = 90° = \pi/2$ radians $$K = \dfrac{2T_u}{\lambda^2} = \dfrac{2(100) 2\pi}{(\pi/2)^2 360} = 1.41471 \dfrac{\text{ft. lb.}}{\text{Deg.}}$$

The torque developed by the torsion bar to counteract the mass unbalance is then $$T = K\psi \dfrac{L_1}{L_2}. \quad (15)$$

Values for T are shown in column 5 of Table III. The error in developed torque is then $$T_E = T - T_u \sin\phi \quad (16)$$

TABLE III

| | | | | Values for 100 ft. | |
|---|---|---|---|---|---|
| $\phi$ DEG | EQ (10) $\psi$DEG | EQ (13) E$\psi$—90 $\sqrt{1-\cos\phi}$ | EQ (14) $L_1/L_2$ | EQ(15) $T_{ft.\ lb.}$ | EQ(16) $T_{E\ ft.\ lb.}$ |
| −20 | −22.5752 | X | 1.13878 | −36.369 | −2.168 |
| −15 | −16.8932 | X | 1.13398 | −27.101 | −1.219 |
| −10 | −11.2358 | X | 1.12894 | −17.945 | −.580 |
| −5 | −5.6043 | X | 1.12363 | −8.909 | −.193 |
| 0 | 0.0000 | 0 | 1.11802 | 0 | 0 |
| 5 | 5.5752 | +.0234 | 1.11201 | 8.771 | +.055 |
| 10 | 11.1193 | +.0262 | 1.10551 | 18.390 | +.025 |
| 15 | 16.6293 | +.0160 | 1.09839 | 25.840 | −.042 |
| 20 | 22.1018 | 0 | 1.09046 | 34.096 | −.106 |
| 25 | 27.5322 | −.0161 | 1.08150 | 42.125 | −.137 |
| 30 | 32.9147 | −.0276 | 1.07124 | 49.882 | −.118 |
| 35 | 38.2419 | −.0317 | 1.05934 | 57.312 | −.046 |
| 40 | 43.5047 | −.0273 | 1.04542 | 64.342 | +.063 |
| 45 | 48.6920 | −.0156 | 1.02905 | 70.886 | +.175 |
| 50 | 53.7905 | 0 | 1.00986 | 76.848 | +.244 |
| 55 | 58.7855 | +.0145 | .987608 | 82.134 | +.219 |
| 60 | 63.6615 | +.0219 | .962338 | 86.671 | +.068 |
| 65 | 68.4045 | +.0175 | .934537 | 90.438 | −.193 |
| 70 | 73.0044 | 0 | .905214 | 93.491 | −.472 |
| 75 | 77.4566 | −.0261 | .875806 | 95.970 | −.623 |
| 80 | 81.7649 | −.0486 | .847898 | 98.079 | −.401 |
| 85 | 85.9404 | −.0482 | .822870 | 100.045 | +.426 |
| 90 | 90.0000 | 0 | .801643 | 102.068 | +2.068 |
| 95 | 93.9639 | X | .784622 | 104.301 | +4.682 |
| 100 | 97.8532 | X | .771793 | 106.842 | +8.362 |
| 105 | 101.6884 | X | .762885 | 109.748 | +13.156 |
| 110 | 105.4880 | X | .757509 | 113.047 | +19.078 |

Figure 4:
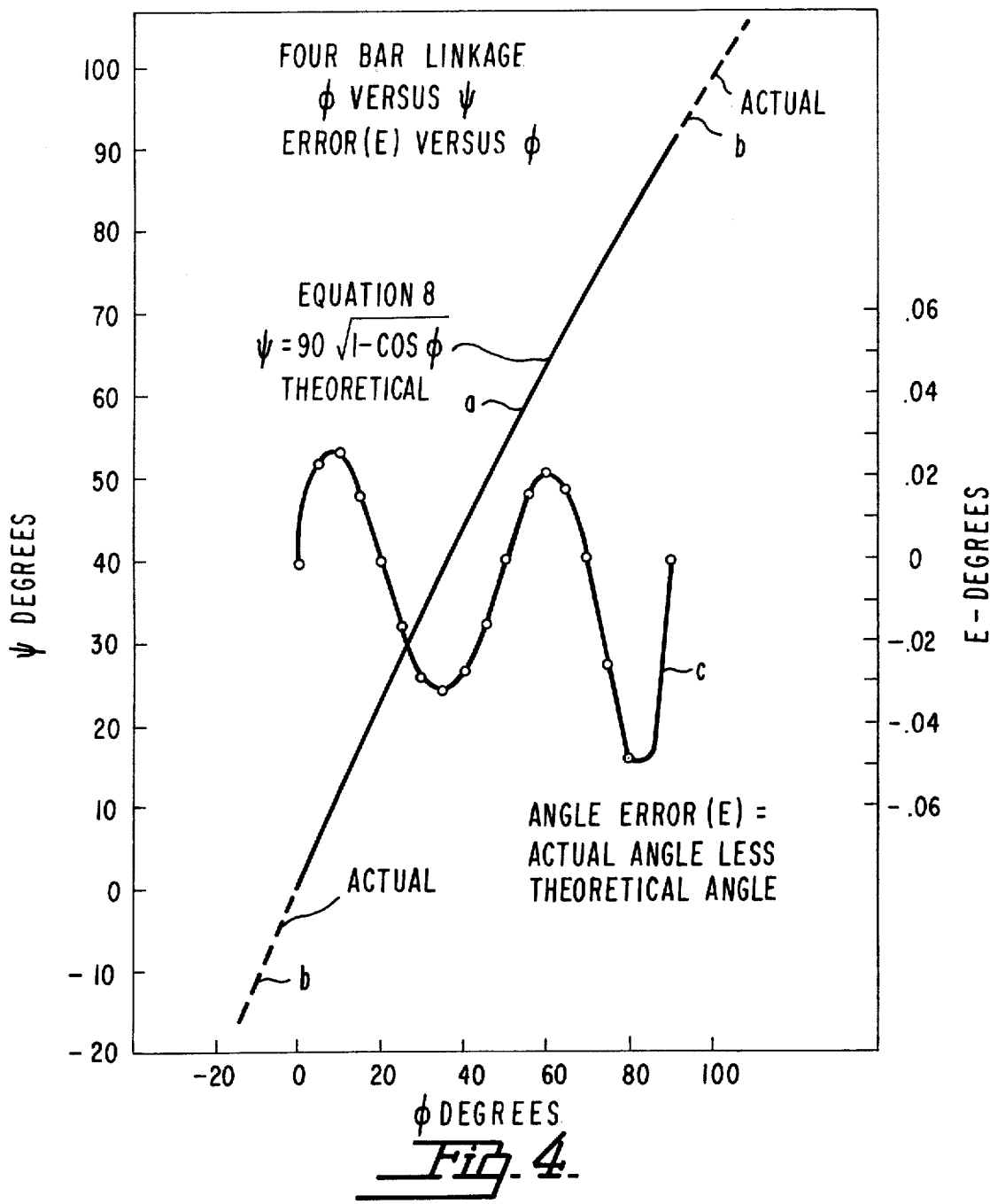

FIG. 4 shows the theoretical waveform a plotted with actual waveform b which are plots of the angles $\phi$ and $\psi$ for the respective theoretical and actual linkages. The error, being minute, is magnified in the plot of waveform c. Waveform c is the plot of error versus the angle $\phi$. It is seen that there is zero error at the selected $\phi$ angles of 0°, 20°, 50°, 70° and 90°. The maximum positive error is less than 0.03° and the maximum negative error is less than −0.05°.

Figure 5:
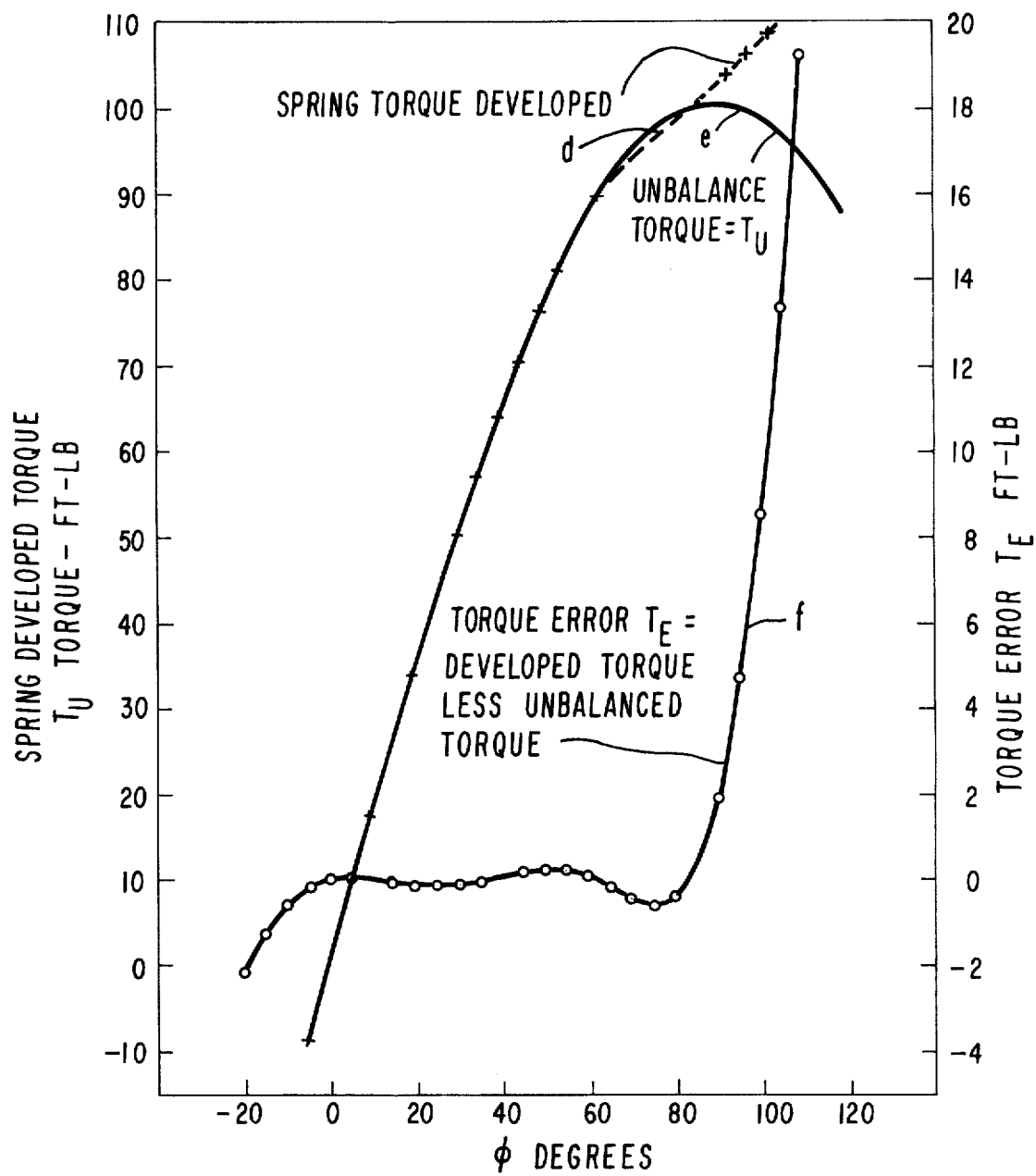

FIG. 5 shows the unbalance torque $Tu$, waveform e, as a function of $\phi$ for an assumed arbitrary 100 ft.lb. of unbalance. Also shown is the torque waveform d developed by the four bar linkage and torsion bar system (column 5 of Table III). The torque error $T_E$, waveform f (column 6 of Table III) is also plotted on FIG. 5, the torque error within the design travel region of 90° being less than 2.1%. For excess travel at either end of the 90° travel range the torque error increases rapidly with spring torque exceeding unbalance torque and tending to drive the load back to the 90° region.

TORSION BAR

The torsional deflection $\lambda$ of bar 34 is determined by its sectional inertia $J$, shear modulus $G$, length $L$ and applied torque $T_u$ and is:

$$\lambda = \frac{T_u L}{JG} \tag{17}$$

The maximum shear stress $S_{SM}$ for a bar of diameter $D$ is:

$$S_{SM} = \frac{TuD}{J2}$$

Combining and solving for $L$ we have:

$$S_{SM} = \frac{D}{2J} \cdot \frac{JG\lambda}{L} \text{ or } L = \frac{DG\lambda}{2S_{SM}}$$

Rearranging equation 17

$$\frac{Tu}{\lambda} = \frac{JG}{L} = K$$

and the required stiffness from equation 7 is $k = 2Tu/\lambda^2$ again combining and assuming a solid bar with section inertia $J = \pi D^4/32$ we have $k = JG/L = 2JGS_{SM}/DG\lambda =$ $$\frac{2\pi D^4 S_{SM}}{32 D\lambda} = \frac{\pi D^3 S_{SM}}{16\lambda} = \frac{2Tu}{\lambda^2} \therefore D = \left[\frac{32Tu}{\pi S_{SM}\lambda}\right]^{1/3}$$

Thus, there has been shown an apparatus for balancing a mass unbalance rotating to a given angular position. This apparatus includes a four bar linkage and preferably a linear torsion bar spring.

It is apparent that the torsion bar spring need not be located on the axis of the driven crank. The spring need only be coupled to the driven crank in a one-to-one angular relationship. The one-to-one relationship can be obtained using gears, chain drives or another parallel four bar linkage.

The use of a second linkage is preferred since the driven crank of the basic unit can be made a simple idler and can therefore be arranged such that loads on this idler and its bearings are small. In addition, the torsion spring may be placed at any convenient location. One unique location of the torsion spring attainable with the added linkage is on the axis of the unbalanced mass.

Accurate mass balancing can also be achieved over a 180° travel range by using two independent linkages and springs with the load cranks independently pivoted on the load axis and located by suitable stops on the load. With this arrangement midtravel is at the top dead center position of the unbalanced mass, each linkage and spring working over a 90° range from the dead center position to the maximum unbalance condition.

For situations requiring excessively long torsion bars, two equal, independent linkages and springs may be used. If several torsion springs are required a series of parallel four bar linkages can be arranged in the chain arrangement and connected to the driven crank in a one-to-one angular relationship.

Should the derived linkage proportions appear to be unsuitable, a mere change in the value of angular displacement $\lambda$ may completely redefine the proportions. In the alternative, the proportions of the derived linkage may also be redefined by selecting new values for $\phi_1$, $\phi_2$, $\phi_3$, $\phi_4$ and the corresponding values of $\psi_1$, $\psi_2$, $\psi_3$ and $\psi_4$ in Table I.

What is claimed is:

1. An apparatus for balancing a non-linear torque produced by an offset mass rotating with respect to a support, comprising:
    a four bar linkage wherein each bar is pivotally connected to two other bars of the linkage to form a quadrangle,
    means for securing a first bar to said rotating mass,
    means for securing said support to a second bar, and
    resilient means coupled to said second bar, and a third bar for producing a linear torque on the third bar as that third bar rotates,
    said bars each having a predetermined length, the length of each bar being a function of the angular displacement of the third bar with respect to the angular displacement of the rotating mass, the length of the bars being such that the linear torque at the third bar balances said non-linear torque.

2. The apparatus of claim 1 wherein said resilient means includes a torsion spring.

3. The apparatus of claim 1 wherein said resilient means includes a spring having a spring constant defined by the relationship $$k = \frac{2Tu}{(\lambda)^2}$$

where $k$ is the spring constant of said spring, $Tu$ is the torque unbalance of said third bar and $\lambda$ is the angular displacement of said third bar corresponding to a given angular displacement of said first bar.

4. In combination:
    a body rotatably mounted at a first pivot spaced from the body center of gravity, support means for rotatably mounting said body at said first pivot, a first member rotatably mounted to said body at a second pivot spaced from said first pivot a first predetermined distance, a second member rotatably mounted to said first member at a third pivot spaced from said second pivot a second predetermined distance, said second member being rotatably mounted to said support means at a fourth pivot spaced from said third pivot a third predetermined distance, said fourth and first pivots being spaced a fourth predetermined distance, the torque produced by said body when said body is rotated about said first pivot being non-linear, said first, second, third and fourth distances being a function of the angular displacement of said body, and means for providing a linear torque on one of said members, body and support means to counterbalance said non-linear torque.

5. The combination of claim 4 wherein said torque providing means includes a torsion spring coupled between said support and said second members.

6. The combination of claim 4 wherein said body is an antenna.

7. The combination of claim 4 wherein said predetermined distances are so related such that said linear torque counterbalances said non-linear torque when said body rotates a predetermined displacement.

8. The apparatus of claim 4 wherein the angular displacement of said body and said second member are defined by the relationship $$\left(\frac{\psi}{\lambda}\right)^2 = 1 - \cos\phi$$

where $\Psi$ is the angular displacement of said second member from a reference position wherein said unbalance is substantially zero, $\lambda$ is the maximum angular displacement of said second member corresponding to a given angular displacement of said body and $\phi$ is the angular displacement of said body from said reference position.

9. The apparatus of claim 8 wherein said linear torque providing means is a linear spring having a spring constant defined by the relationship $$k = \frac{2 Tu}{(\lambda)^2}$$

where $k$ is the spring constant of said spring, $Tu$ is the torque unbalance on said second member.

10. In combination:
a four bar linkage,
said bars each having a length which is a function of the angular displacement of a first bar with respect to a second bar,
means for securing a mass to said first bar,
resilient means coupled to said second bar for applying a linear torque to said second bar as said second bar rotates, said linear torque having a value which counterbalances the torque produced by said mass when rotating.

* * * * *

UNITED STATES PATENT OFFICE
CERTIFICATE OF CORRECTION

PATENT NO. : 3,889,551

DATED : June 17, 1975

INVENTOR(S) : Wayne Arthur Harmening

It is certified that error appears in the above-identified patent and that said Letters Patent are hereby corrected as shown below:

Cols. 5 & 6 (Table II), Line 1
"$C=\lambda\sqrt{1-\cos\phi}$" should read -- $\psi=\lambda\sqrt{1-\cos\phi}$ --

Cols. 5 & 6, (Table II), Line 43
"$H_1=A_5F_1+B_5G_1-B_6G_2+A_7F_3+B_7G_3-A_8F_4-B_8G_4=-1.44012\times10^{-4}$"
should read
-- $H_1=A_5F_1+B_5G_1-A_6F_2-B_6G_2+A_7F_3+B_7G_3-A_8F_4-B_8G_4=-1.44012\times10^{-4}$ --

Col. 7, line 17
"$[R\sin(\alpha+\phi)-r\sin(\alpha+\psi)]^2+[1-R\cos(\alpha+\phi)$" should read
-- $[R\sin(\alpha+\phi)-r\sin(\beta+\psi)]^2+[1-R\cos(\alpha+\phi)$ --

Signed and Sealed this second Day of March 1976

[SEAL]

Attest:

RUTH C. MASON
*Attesting Officer*

C. MARSHALL DANN
*Commissioner of Patents and Trademarks*